United States Patent [19]
Kondo

[11] Patent Number: 5,907,289
[45] Date of Patent: May 25, 1999

[54] RADIO SELECTIVE CALL RECEIVER

[75] Inventor: Hisashi Kondo, Shizuoka, Japan

[73] Assignee: NEC Corporation, Tokyo, Japan

[21] Appl. No.: 08/891,390

[22] Filed: Jul. 11, 1997

[30]  Foreign Application Priority Data

Jul. 12, 1996 [JP] Japan .................................. 8-183486

[51] Int. Cl.⁶ .................................................. G08B 5/22
[52] U.S. Cl. .................... 340/825.44; 341/141; 341/144; 341/155; 455/38.1; 455/38.3; 455/462; 455/506
[58] Field of Search ....................... 340/825.44; 341/141, 341/144, 155; 455/38.1, 38.3, 462, 506

[56]  References Cited

U.S. PATENT DOCUMENTS 5,506,700  4/1996  Nishimura .............................. 341/141
5,793,303  8/1998  Koga ................................. 340/825.44

FOREIGN PATENT DOCUMENTS 2 303 724  2/1997  United Kingdom.

Primary Examiner—Brian Zimmerman
Assistant Examiner—Yves Dalencourt
Attorney, Agent, or Firm—Scully, Scott, Murphy & Presser

[57]  ABSTRACT

A radio selective call receiver includes an instruction input device which produces an analog input signal and a radio receiver which receives a radio signal and demodulating it to produce an analog demodulated signal whose amplitude varies in a symbol period. A selector selects one of the analog input signal and the analog demodulated signal and is connected to an A-D converter. The A-D converter is shared between the analog demodulated signal and the analog input signal. An A-D conversion of the analog demodulated signal is performed at intervals synchronizing with the analog demodulated signal. An A-D conversion of the analog input signal is performed within a time period during which the analog-to-digital conversion of the analog demodulated signal is not performed.

13 Claims, 5 Drawing Sheets

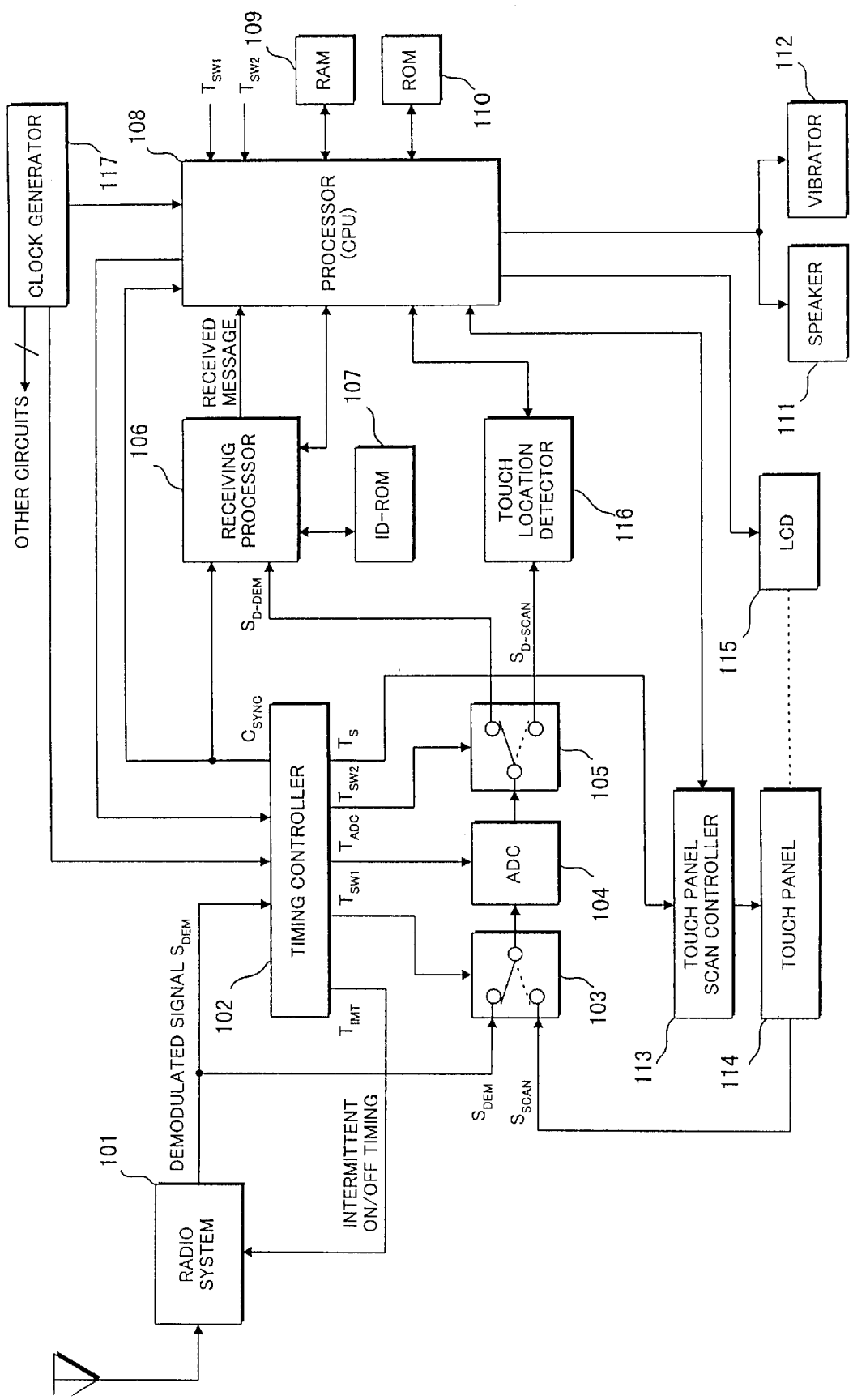

RADIO SELECTIVE CALL RECEIVER

BACKGROUND OF THE INVENTION

1. Field of the invention

The present invention generally relates to a radio selective call receiver such as a mobile terminal and, in particular, to a radio selective call receiver having an analog-to-digital (A-D) converter which is used to convert an analog demodulated signal to a digital form.

2. Description of the Related Art

A selective call receiver has been widely used for various purposes and, especially, a small-sized and lightweight selective call receiver, or a pager, is suitable for being taken on the road. A basic function of the selective call receiver is to indicate by beep sound, vibration, or light the incoming call and then to inform the user of a received message, for example, by displaying the received message on a liquid-crystal display (LCD) according to user's key operation.

In general, the selective call receiver is provided with several keys for inputting user's instructions such as stopping a beep, selecting a message, and deleting the message. Such a key is formed with, for example, a push button or a slide switch.

It is also known that a touch-sensitive pad, a touch-sensitive panel, or a touch-sensitive screen is widely used to determine the location of a touch on a display. Therefore, such a touch-sensitive pointing device may be used as an input device of the selective call receiver instead of the above operation keys.

In view of a selective call receiver, the touch-sensitive pointing device preferably employs the simplest structure having a pair of transparent electrodes so as to sense the X-Y location of a touch, and a voltage is alternately applied to X and Y sensing lines. The X-Y sense output voltages of the touch-sensitive pointing device are digitized by an A-D converter and the digital output signal is used to determine the location of a touch by a touch location detector.

However, the touch sensing operation and the A-D conversion for touch sense signals cause noises which adversely affect not only the receiving sensitivity but also the quality of received signals.

Further, in addition to an A-D converter for received signals, another A-D converter for the touch sense signal is needed, which results in increased necessary space and power consumption.

SUMMARY OF THE INVENTION

An object of the present invention is to provide a selective call receiver which is provided with an input device requiring electrical processing without deteriorating the receiving sensitivity or the quality of received signals.

Another object of the present invention is to provide a selective call receiver having a touch-sensitive pointing device, which prevents the receiving sensitivity and the quality of received signals from reducing and further saves space and power consumption.

According to the present invention, an A-D converter is used to alternately digitize a demodulated signal and an instruction input signal at predetermined intervals such that the instruction input signal is digitized in each time period during which the demodulated signal is not digitized. In other words, a single A-D converter is shared between a signal receiving system and an instruction input system.

According to an aspect of the present invention, a radio selective call receiver includes an input device for inputting an instruction to produce an analog input signal and a radio receiver for receiving a radio signal and demodulating it to produce an analog demodulated signal whose amplitude varies in a symbol period. The radio selective call receiver further includes a selector and a timing controller. The selector selects one of the analog input signal and the analog demodulated signal and is connected to an A-D converter for converting a selected signal to a digital form. The timing controller controls the selector and the A-D converter so as to share the A-D converter between the analog demodulated signal and the analog input signal. More specifically, an A-D conversion of the analog demodulated signal is performed at intervals synchronizing with the analog demodulated signal to produce a digital modulated signal. An A-D conversion of the analog input signal is performed within a time period during which the analog-to-digital conversion of the analog demodulated signal is not performed to produce a digital input signal.

As described above, a single A-D converter is shared between a signal receiving processing and an instruction input processing which are prevented from concurrent processing. Therefore, the reduced space and the reduced power consumption are both achieved, and further it can avoid the influence of the instruction input processing upon the receiving sensitivity and the quality of a received signal.

BRIEF DESCRIPTION OF THE DRAWINGS

FIG. 1 is a block diagram showing the functional configuration of a radio selective call receiver according to an embodiment of the present invention.

DETAILED DESCRIPTION OF THE PREFERRED EMBODIMENT

Figure 2A:
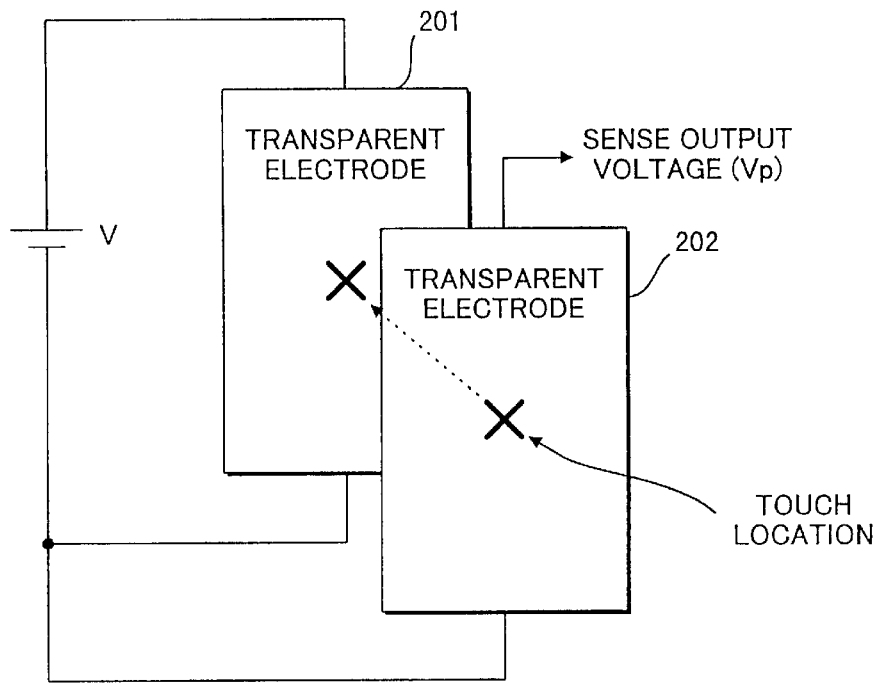
FIG. 2A is a schematic diagram showing an example of a touch panel of the embodiment.

Referring to FIG. 1, there is shown a selective call receiver in accordance with the present invention. An antenna Is connected to a radio system 101 which receives a radio digital-modulated signal from a radio base station (not shown) through the antenna. The received digital-modulated signal is demodulated into an analog baseband signal varying in voltage amplitude in symbol periods. The waveform of the analog baseband signal is shaped to produce a demodulated signal $S_{DEM}$ which is output to a timing controller 102 and a first switch (or input selector) 103. The timing controller 102 generates necessary timing signals based on the demodulated signal $S_{DEM}$ as will be described in detail. The timing signals includes an intermittent timing signal $T_{IMT}$, a first switching timing signal $T_{SW1}$, an ADC timing signal $T_{ADC}$, a second switching timing signal $T_{SW2}$, and a scan timing signal $T_S$.

According to the first switching timing signal $T_{SW1}$, the first switch 103 selects one of the demodulated signal $S_{DEM}$ and an analog scan signal $S_{SCAN}$ which is generated by a touch panel (or a touch screen) 114. A selected one is output to an A-D converter (ADC) 104 where it is converted into a digital form according to the ADC timing signal $T_{ADC}$, and then the digital signal is output to a second switch (or output divider) 105. The second switch 105 transfers the digital output of the A-D converter 104 to a selected one of a receiving processor 106 and a touch location detector 116 in accordance with the second switching timing signal $T_{SW2}$. The first and second switches 103 and 105 may be formed with a switching transistor The receiving processor 106 receives the digital demodulated signal $S_{D\text{-}DEM}$ from the second switch 105 and performs decoding of the digital demodulated signal $S_{D\text{-}DEM}$, and detection of an incoming call. The incoming call is detected by comparing a received calling number with a preset ID number which is previously stored in an ID ROM (read-only memory) 107. When the received calling number is identical to the preset ID number, the receiving processor 106 informs a processor (CPU) 108 of an incoming call and then transfers the message data following the preset ID number portion to the processor 108. The received message is stored onto a random access memory (RAM) 109.

The processor 108 performs the processing operations for the selective call receiver according to a control program stored in a program ROM 110. When the received calling number is identical to the preset ID number, the processor 108 controls a speaker 111 and/or a vibrator 112 to inform the user of the incoming call by sound and/or vibration. The processor 108 outputs a touch panel control signal to a touch panel scan controller 113 which controls the scan operation of the touch panel 114. The touch panel 114 is provided on an LCD panel 115 which displays key graphic images, a received message, or other necessary information under the control of the processor 108.

The touch panel 114 outputs the analog scan signal $S_{SCAN}$ to the first switch 103 under control of the touch panel scan controller 113. The analog scan signal $S_{SCAN}$ is transferred to the A-D converter 104 through the first switch 103 and is converted to the digital scan signal $S_{D\text{-}SCAN}$ by the A-D converter 104. After that, the digital scan signal $S_{D\text{-}SCAN}$ is transferred to the touch location detector 116 through the second switch 105. Based on the digital scan signal $S_{D\text{-}SCAN}$, the touch location detector 116 detects the location of a touch on the touch panel 114 and outputs the touch location data to the processor 108. When receiving the touch location data from the touch location detector 116, the processor 108 performs a processing operation specified by the location of the user's touch, for example, beep stopping or message displaying. A clock generator 117 supplies reference clock signals to the timing controller 102, the processor 108 and other circuits.

It should be noted that the timing controller 102, the second switch 105, the receiving processor 106 and the touch location detector 116 may be implemented with a program-controlled processor or a digital signal processor (DSP).

Figure 2B:
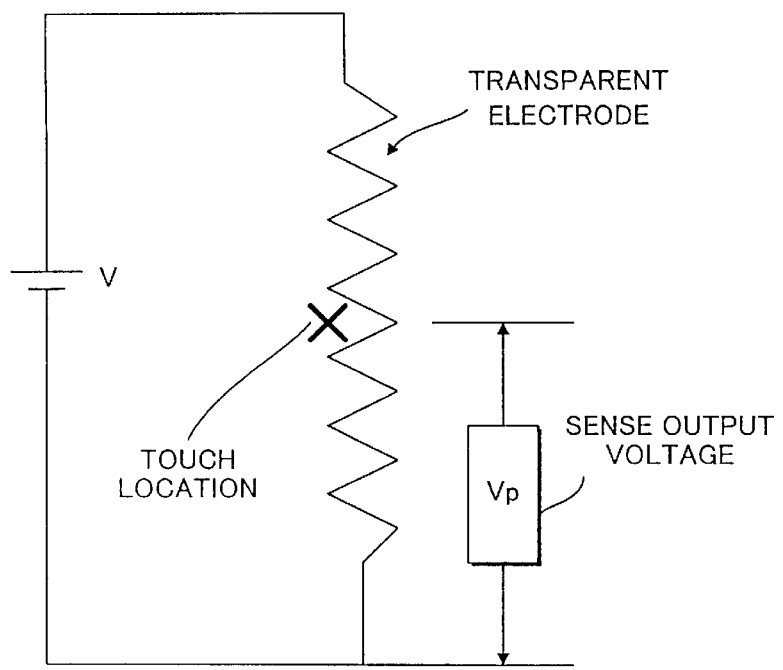
FIG. 2B is a schematic circuit diagram showing the example of a touch panel of the embodiment.

Referring to FIGS. 2A and 2B, the touch panel 114 placed on the LDC panel 115 is comprised of a pair of polyester transparent electrodes spacing through insulating dot spacers. A driving voltage V is applied to one transparent electrode 201 with alternating X and Y directions by the touch panel controller 113. More specifically, when the user touches the surface of the touch panel 103, the touch causes a change of X and Y output voltages depending on the location of a touch. Therefore, the touch location can be detected from a sense output signal $V_P$ in each of X and Y directions of the touch panel 114. More specifically, the processor 108 outputs a direction signal to the touch panel scan controller 113 and the touch location detector 116 so that they can determine the direction of sense voltage, X or Y. Therefore, the touch panel 114 outputs a sense voltage in the specified direction and then the touch location detector 116 can specify the location of the user's touch on the touch panel 114 based on the respective sense voltages in the X and Y directions.

The processor 108 controls the LCD panel 115 so that a plurality of key images are displayed at predetermined positions on screen. As described before, the driving voltage V is turned off and the touch panel 114 is not operated in a time period during which the receiving process is performed.

TIMING CONTROL

Figure 3:
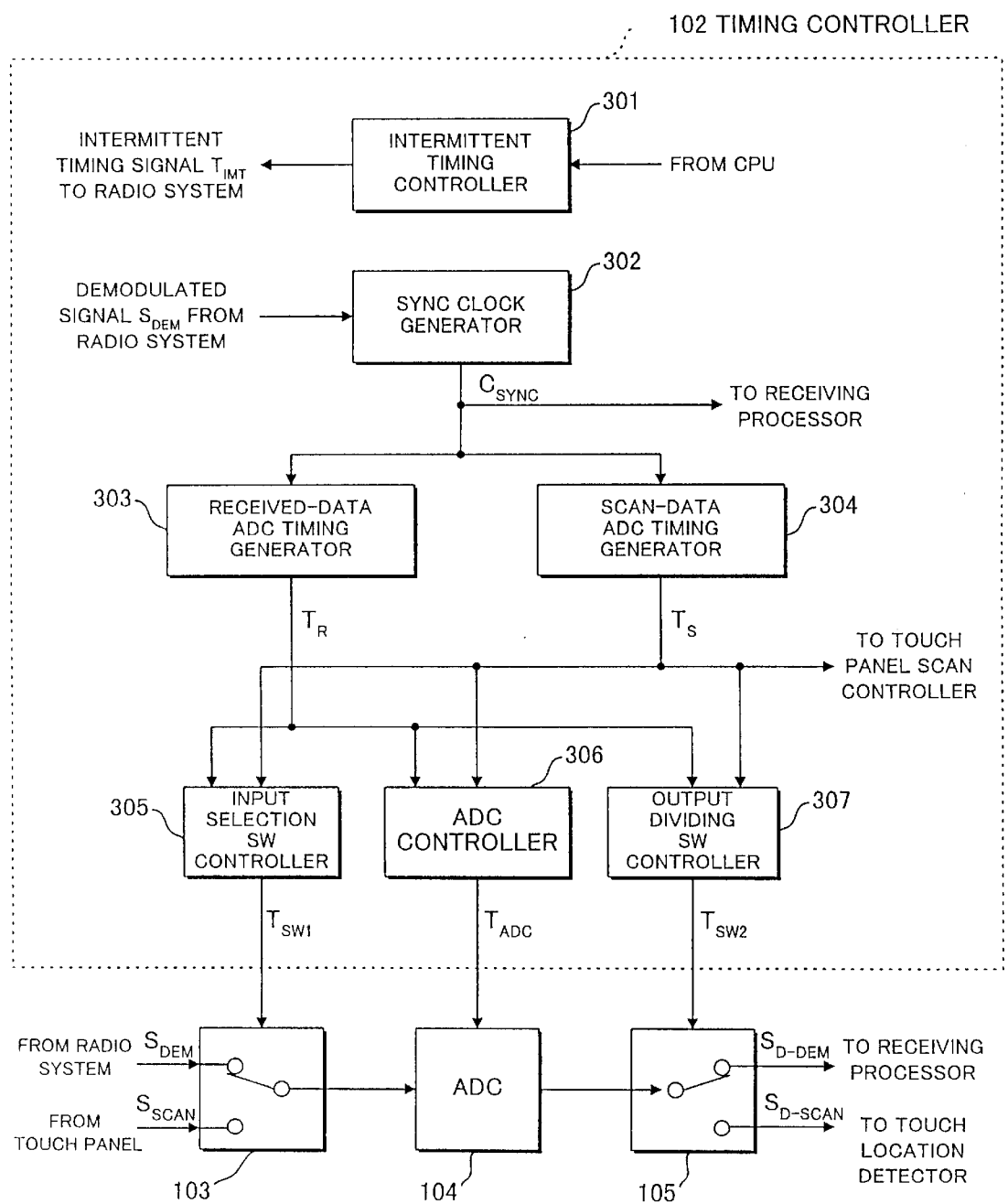
FIG. 3 is a block diagram showing a timing controller in the radio selective call receiver as shown in FIG. 1.

Referring to FIG. 3, the timing controller 102 generates necessary timing signals based on the demodulated signal $S_{DEM}$ received from the radio system 101. The radio system 101 performs an intermittent receiving operation according to the intermittent on/off timing signal $T_{IMT}$ which is generated by an intermittent timing controller 301 receiving an intermittent reception control signal from the processor 108. Therefore, the radio system 101 receives a radio signal to produce the demodulated signal $S_{DEM}$ when the intermittent on/off timing signal $T_{IMT}$ is ON.

The timing controller 102 is provided with a sync clock generator 302 receiving the demodulated signal $S_{DEM}$ from the radio system 101. The sync clock generator 302 generates a sync clock signal $C_{SYNC}$ synchronizing with the demodulated signal $S_{DEM}$. The sync clock signal $C_{SYNC}$ is supplied to a received-data ADC timing generator 303 and a scan-data ADC timing generator 304. The received-data ADC timing generator 303 generates a received-data ADC timing signal $T_R$ and the scan-data ADC timing generator 304 generates a scan-data ADC timing signal $T_S$ from the sync clock signal $C_{SYNC}$. The received-data ADC timing signal $T_R$ is output to an input selection switch controller 305, an ADC controller 306 and an output dividing switch controller 307. The scan-data ADC timing signal $T_S$ is also output to the input selection switch controller 305, the ADC controller 306 and the output dividing switch controller 307.

The input selection switch controller 305 generates the first switching timing signal $T_{SW1}$, the ADC controller 306 generates the ADC timing signal $T_{ADC}$, and the output dividing switch controller 307 generates the second switching timing signal $T_{SW2}$, from the received-data ADC timing signal $T_R$ and the scan-data ADC timing signal $T_S$. The first switching timing signal $T_{SW1}$, the ADC timing signal $T_{ADC}$, and the second switching timing signal $T_{SW2}$ are output to the first switch 103, the A-D converter 104, and the second switch 105, respectively. In this embodiment, when the first switching timing signal $T_{SW1}$ is high or 1, the first switch 103 selects the demodulated signal $S_{DEM}$ and, otherwise it selects the scan signal $S_{SCAN}$. Simllarly, when the second switching timing signal $T_{SW2}$ is high or 1, the second switch 105 selects an output to the receiving processor 106 and, otherwise it selects the other output to the touch location detector 116.

Figure 4:
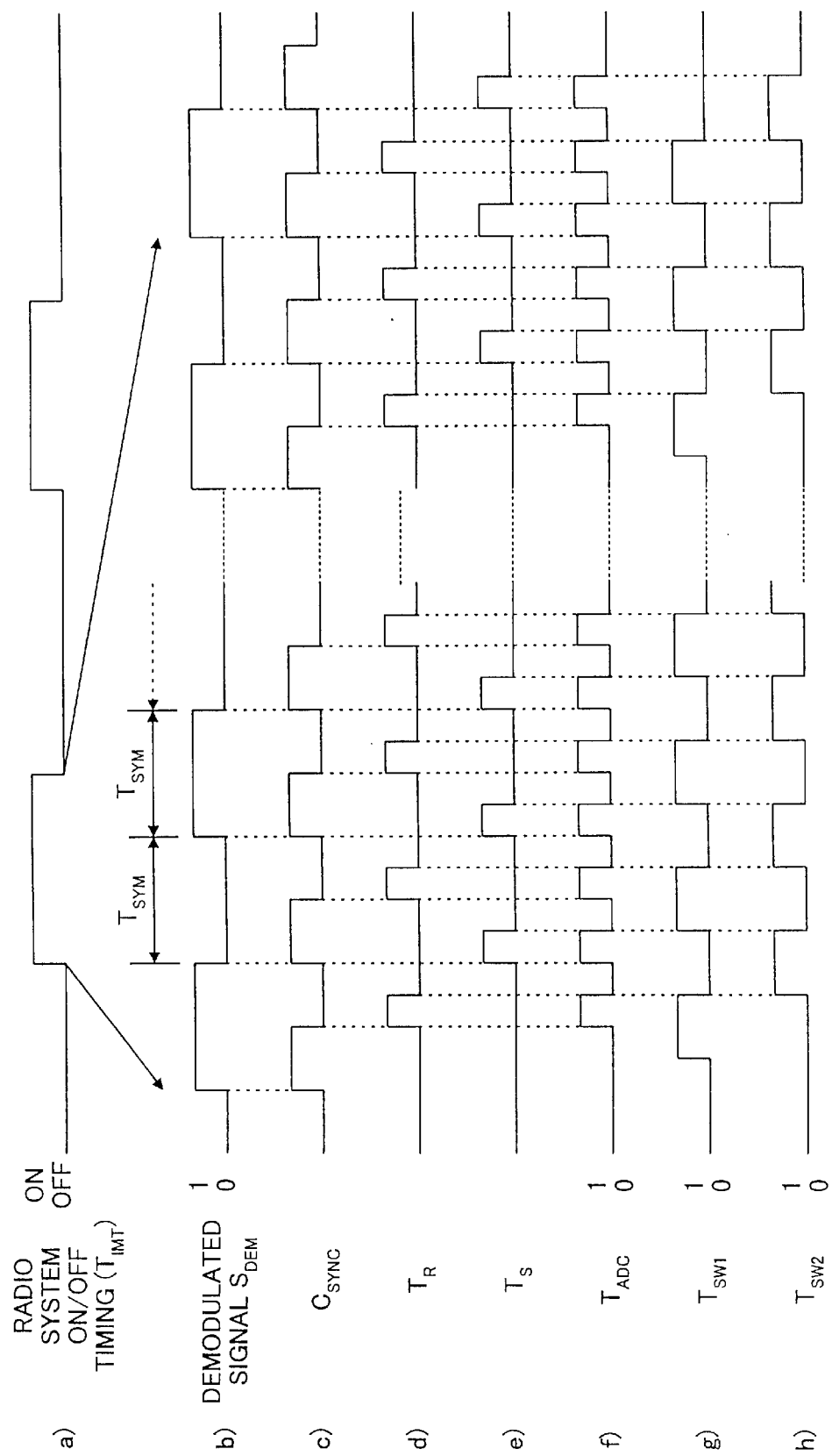
FIG. 4 is a timing chart showing an operation of the timing controller as shown in FIG. 3.

Referring to FIG. 4, the radio system 101 performs an intermittent receiving operation according to the intermittent on/off timing signal $T_{IMT}$ as shown in FIG. 4(a). Therefore, the demodulated signal $S_{DEM}$ having a symbol period $T_{SYN}$ as shown in FIG. 4(b) is output to the timing controller 102 when the intermittent on/off timing signal $T_{IMT}$ high or ON. In FIG. 4(b), it is assumed for simplicity that the amplitude of the demodulated signal $S_{DEM}$ is changing between high and low in symbols when the radio system 101 is receiving, for example, a preamble signal.

The sync clock generator 302 generates the sync clock signal $C_{SYNC}$ synchronizing with the demodulated signal $S_{DEM}$ as shown in FIG. 4(c). More specifically, the sync clock signal $C_{SYNC}$ goes high on the rising and trailing edges of the demodulated signal $S_{DEM}$ and is kept high for a half the symbol period $T_{SYM}$ of the demodulated signal $S_{DEM}$.

When receiving the sync clock signal $C_{SYNC}$, the received-data ADC timing generator 303 generates the received-data ADC timing signal $T_R$ such that it goes high on the trailing edge of the sync clock signal $C_{SYNC}$ and is kept high for a quarter the symbol period $T_{SYM}$, as shown in FIG. 4(d). Since the received-data ADC timing signal $T_R$ goes high in the middle of each symbol period, the demodulated signal $S_{DEM}$ is converted by the A-D converter 104 at the time when the demodulated signal $S_{DEM}$ has been stable. The pulse width of the received-data ADC timing signal $T_R$ may be determined depending on the A-D converter 104.

When receiving the sync clock signal $C_{SYNC}$, the scan-data ADC timing generator 304 generates the scan-data ADC timing signal $T_S$ such that the scan-data ADC timing signal $T_S$ goes high on the rising edge of the sync clock signal $C_{SYNC}$, and is kept high for a quarter the symbol period $T_{SYM}$, as shown in FIG. 4(e). The scan-data ADC timing signal $T_S$ is also output to the touch panel scan controller 113 where it Is used for scan timing of the touch panel 114. The pulse width of the scan-data ADC timing signal $T_S$ may be determined depending on the A-D converter 104.

The ADC controller 306 generates the ADC timing signal $T_{ADC}$ by the logical OR of the received-data ADC timing signal $T_R$ and the scan-data ADC timing signal $T_S$ as shown in FIG. 4(f).

The input selection switch controller 305 generates the first switching timing signal $T_{SW1}$ from the received-data ADC timing signal $T_R$ and the scan-data ADC timing signal $T_S$ as shown in FIG. 4(g). More specifically, the first switching timing signal $T_{SW1}$ goes high on the trailing edge of the scan-data ADC timing signal $T_S$ and goes low on the trailing edge of the received-data ADC timing signal $T_R$. As described before when the first switching timing signal $T_{SW1}$ is high, the demodulated signal $S_{DEM}$ is selected by the first switch 103 and is output to the A-D converter 104. Otherwise the scan signal $S_{SCAN}$ is output to the A-D converter 104.

Contrarily, the output dividing switch controller 307 generates the second switching timing signal $T_{SW2}$ from the received-data ADC timing signal $T_R$ and the scan-data ADC timing signal $T_S$ as shown In FIG. 4(h). More specifically, the second switching timing signal $T_{SW2}$ goes high on the trailing edge of the received-data ADC timing signal $T_R$ and goes low on the trailing edge of the scan-data ADC timing signal $T_S$. As described before, when the second switching timing signal $T_{SW2}$ is high, the digital output of the A-D converter 104 is output to the receiving processor 106 through the second switch 105. Otherwise, the digital output of the A-D converter 104 is output to the touch location detector 116 through the second switch 105.

The phase difference between the first and second switching timing signals $T_{SW1}$ and $T_{SW2}$ as shown in (g) and (h) of FIG. 4 is provided taking into account the time required for A-D conversion. Therefore, the demodulated signal $S_{DEM}$ is input to the A-D converter 104 in symbols according to the timing of 'high' of the first switching timing signal $T_{SW1}$ and the A-D conversion for the demodulated signal $S_{DEM}$ is performed according to the received-data ADC timing signal $T_R$. Then, the digital demodulated signal $S_{D-DEM}$ is output to the receiving processor 106 according to the timing of 'high' of the second switching timing signal $T_{SW2}$.

On the other hand, the scan signal $S_{SCAN}$ is input to the A-D converter 104 according to the timing of 'low' of the first switching timing signal $T_{SW1}$ and the A-D conversion is performed according to the scan-data ADC timing signal $T_S$. Then, the digital scan data $S_{D-SCAN}$ is output to the touch location detector 116 according to the timing of 'low' of the second switching timing signal $T_{SW2}$.

Therefore, the A-D conversion for the scan signal $S_{SCAN}$ is performed in each time period during which the A-D conversion for the demodulated signal $S_{DEM}$ is not performed. In other words, in the case of the radio system 101 receiving the radio signal, the scan signal $S_{SCAN}$ is not input to the A-D converter 104 and the touch location detector 116 is not operated in a time period during which the demodulated signal $S_{DEM}$ is input to the receiving processor 106. In this manner, the received signal processing and the touch panel processing are alternately performed without concurrent processing. Therefore, the receiving processing is not influenced by noises caused by touch location detection.

Figure 5:
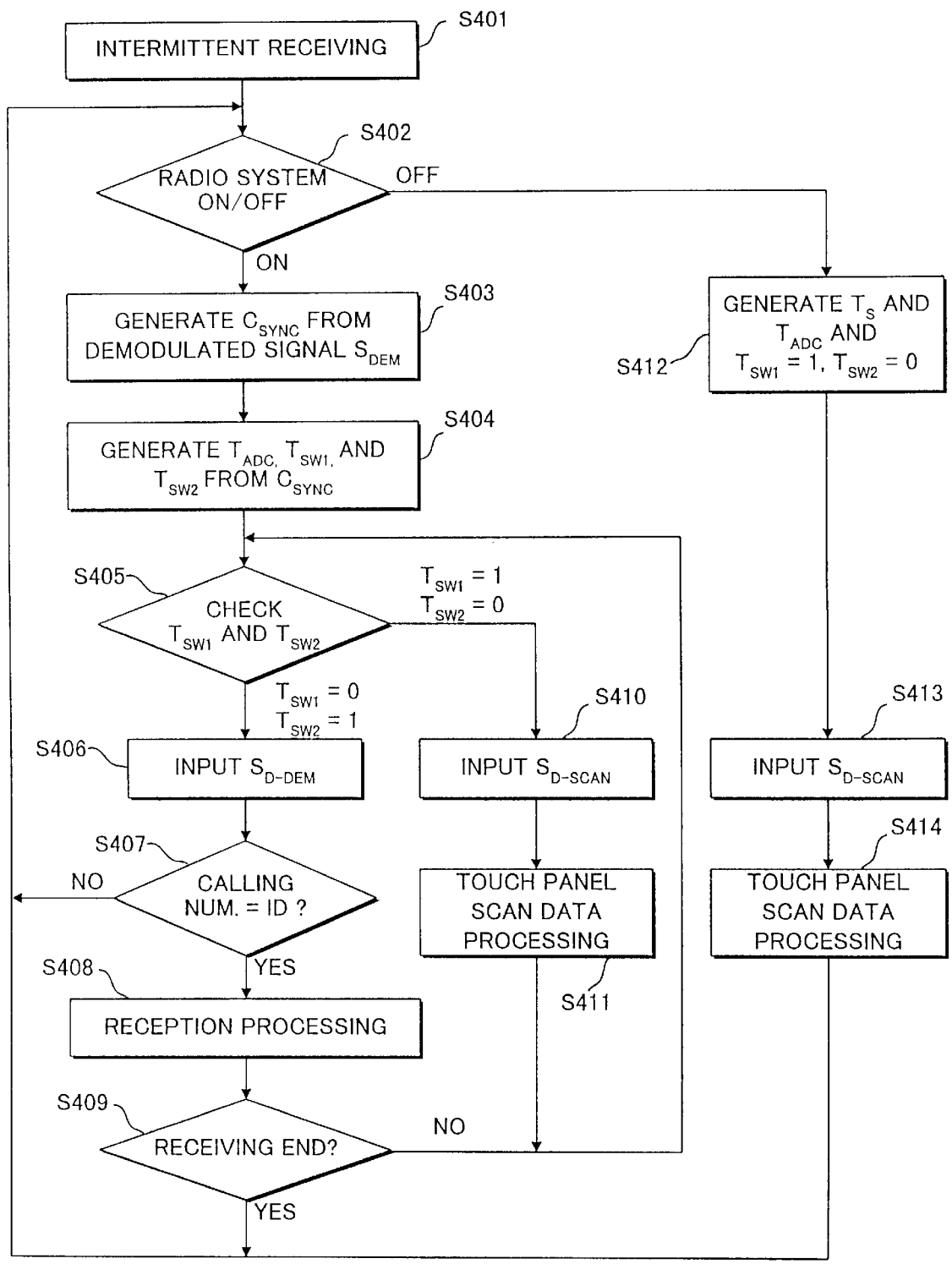
FIG. 5 is a flowchart showing an operation of the radio selective call receiver as shown in FIG. 1.

Referring to FIG. 5, the processor 108 instructs the timing controller 102 to output the intermittent on/off timing signal $T_{IMT}$ by which the radio system 101 switches on and off in predetermined periods (step S401). When the intermittent on/off timing signal $T_{IMT}$ is ON, that is, the radio system 101 is in ON state (ON in step S402), the sync clock signal $C_{SYNC}$ is generated in synchronization with the demodulated signal $S_{DEM}$ (step S403) and then the first switching timing signal $T_{SW1}$, the ADC timing signal $T_{ADC}$, the second switching timing signal $T_{SW2}$, and the scan timing signal $T_S$ are generated from the sync clock signal $C_{SYNC}$ and are used to control the first switch 103, the A-D converter 104, the second switch 105, and the touch panel scan controller 113, respectively (step S404).

In the switching and A-D converting operations as described above, the processor 108 determines which digital signal is output from the A-D converter 104 by monitoring the first and second switching timing signals $T_{SW1}$ and $T_{SW2}$ (step S405). When $T_{SW1}$ is low and $T_{SW2}$ is high (step S405), the processor 108 selects the receiving process control, and the receiving processor 106 inputs the digital demodulated data $S_{D-DEM}$ from the second switch 105 (step S406). Subsequently, the receiving processor 106 checks whether the received calling number is identical to the preset ID number (step S407) If it is identical to the preset ID number (YES in step S407), the processor 108 performs the reception processing such as the selective call detection, the informing operation, and the message storing operation as described before (step S408). When the receiving operation is terminated (YES in step S409) or when the received calling number is not identical to the preset ID number (NO step S407), control goes back to the intermittent receiving step S402. When the receiving operation is not terminated (NO in step S409), control goes back to the check step S405.

On the other hand, when $T_{SW1}$ is high and $T_{SW2}$ is low (S405), the processor 108 selects the touch panel control and the touch location detector 116 inputs the digital scan data $S_{D-SCAN}$ from the second switch 105 (step S410). Then, the processor 108 performs the touch panel scan data processing (step S411). For example, in cases where the user touches a key image for stopping the beep sound, the processor 108 stops the speaker 111 operating. Further, when the user touches another key image for selecting and displaying the received message on screen, the processor 108 reads a selected message from the RAM 109 and displays it on the LCD panel 115. After the touch panel scan data processing (step S411), control goes back to the check step S405.

When the intermittent on/off timing signal $T_{IMT}$ is OFF, that is, the radio system 101 is in OFF state (OFF in step S402), only the touch panel scan data processing is performed. Therefore, after generating the scan timing signal $T_S$ and the ADC timing signal $T_{ADC}$ and fixing $T_{SW1}$ and $T_{SW2}$ to high '1' and low '0', respectively (step S412). the touch location detector 116 inputs the digital scan data $S_{D\text{-}SCAN}$ from the second switch 105 (step S413), and then the processor 108 performs the touch panel scan data processing (step S414). In the case of the radio system 101 in OFF state (OFF in step S402), there is no need to control the switching timing signals $T_{SW1}$ and $T_{SW2}$.

As described above, the A-D converter 104 is used to alternately digitize the demodulated signal $S_{DEM}$ and the scan signal $S_{SCAN}$ in the case of the radio system 101 operating. In other words, a single A-D converter is shared between the received signal processing operation and the scan signal processing operation without concurrent processing. Therefore, it can achieve the reduced space and power consumption and further it can avoid the influence of the scan signal processing operation upon the receiving sensitivity and the quality of received signals.

What is claimed is:

1. A radio selective call receiver comprising:
   an input device for inputting an instruction to produce an analog input signal;
   a radio receiver for receiving a radio signal and demodulating it to produce an analog demodulated signal whose amplitude varies in a symbol period;
   a selector for selecting one of the analog input signal and the analog demodulated signal;
   an analog-to-digital converter connected to the selector, for converting a selected signal to a digital form;
   a timing controller for controlling the selector and the analog-to-digital converter such that an analog-to-digital conversion of the analog demodulated signal is performed at intervals synchronizing with the analog demodulated signal to produce a digital modulated signal, and that an analog-to-digital conversion of the analog input signal is performed within a time period during which the analog-to-digital conversion of the analog demodulated signal is not performed to produce a digital input signal: and
   a processor for detecting an incoming call from the digital modulated signal and identifying the instruction from the digital input signal.

2. The radio selective call receiver according to claim 1, wherein the processor comprises:
   a divider for dividing a digital output signal of the analog-to-digital converter into a digital demodulated signal and a digital input signal in synchronization with the symbol period:
   a reception processor for detecting the incoming call from the digital demodulated signal by comparing a calling number included in the digital demodulated signal with a preset identification number; and
   an input signal processor for identifying the instruction from the digital input signal.

3. The radio selective call receiver according to claim 1, further comprising a display for displaying predetermined key images under control of the processor,
   wherein the input device comprises a transparent touch-sensitive pointing device which is placed on the display to form a touch screen.

4. The radio selective call receiver according to claim 3, wherein the processor comprises:
   a divider for dividing a digital output signal of the analog-to-digital converter into a digital demodulated signal and a digital input signal in synchronization with the symbol period.
   a reception processor for detecting the incoming call from the digital demodulated signal by comparing a calling number included in the digital demodulated signal with a preset identification number; and
   an input signal processor for detecting a touch location on the transparent touch-sensitive pointing device placed on the display for displaying the predetermined key images to identify the instruction.

5. The radio selective call receiver according to claim 1, wherein the timing controller comprises:
   a sync signal generator for generating a synchronization timing signal synchronizing with the analog demodulated signal, the synchronization timing signal having a pulse width which is a half the symbol period;
   a first generator for generating a first conversion timing signal synchronizing with the synchronization timing signal, wherein each pulse of the first conversion timing signal is generated in the middle of the symbol period and the analog-to-digital conversion of the analog demodulated signal is performed by the analog-to-digital converter according to the first conversion timing signal; and
   a second generator for generating a second conversion timing signal synchronizing with the synchronization timing signal, wherein each pulse of the second conversion timing signal is generated between any two pulses of the first conversion timing signal and the analog-to-digital conversion of the analog input signal is performed by the analog-to-digital converter according to the second conversion timing signal.

6. The radio selective call receiver according to claim 5, wherein a pulse width of each of the first and second conversion timing signals is set to a quarter the symbol period.

7. The radio selective call receiver according to claim 5, wherein the timing controller further comprises:
   a third generator for generating a first selecting timing signal from the first and second conversion timing signals, wherein the first selecting timing signal is generated in the middle of the symbol period and is output to the selector.

8. The radio selective call receiver according to claim 2, wherein the timing controller comprises:
   a sync signal generator for generating a synchronization timing signal synchronizing with the analog demodulated signal, the synchronization timing signal having a pulse width which is half the symbol period;
   a first generator for generating a first conversion timing signal synchronizing with the synchronization timing signal, wherein each pulse of the first conversion timing signal is generated in the middle of the symbol period and the analog-to-digital conversion of the analog demodulated signal is performed by the analog-to-digital converter according to the first conversion timing signal;
   a second generator for generating a second conversion timing signal synchronizing with the synchronization timing signal, wherein each pulse of the second conversion timing signal is generated between any two pulses of the first conversion timing signal and the analog-to-digital conversion of the analog input signal is performed by the analog-to-digital converter according to the second conversion timing signal;

a third generator for generating a first selecting timing signal in the middle of the symbol period from the first and second conversion timing signals to output it to the selector, the first selecting timing signal having a pulse width which is half the symbol period; and a fourth generator for generating a second selecting timing signal from the first and second conversion timing signals to output it to the dividers the second selecting timing signal being in inverse relation to the first selecting timing signal.

9. A control method for a radio selective call receiver having an analog-to-digital converter which is shared between a signal receiving process and an instruction input process, comprising the steps of:

a) inputting an instruction to produce an analog input signal;

b) receiving a radio signal and demodulating it to produce an analog demodulated signal whose amplitude varies in a symbol period;

c) selecting one of the analog input signal and the analog demodulated signal to output a selected one to the analog-to-digital converter;

d) performing an analog-to-digital conversion of the analog demodulated signal at intervals synchronizing with the analog demodulated signal to produce a digital demodulated signal;

e) performing an analog-to-digital conversion of the analog input signal within a time period during which the analog-to-digital conversion of the analog demodulated signal is not performed to produce a digital input signal; and f) dividing a digital output of the analog-to-digital converter into the digital demodulated signal and the digital input signal.

10. The control method according to claim 9, further comprising the step of generating a synchronization timing signal synchronizing with the analog demodulated signal, the synchronization timing signal having a pulse width which is a half the symbol period, wherein the step d) comprises the steps of:

generating a first conversion timing signal synchronizing with the synchronization timing signal, wherein each pulse of the first conversion timing signal is generated in the middle of the symbol period; and performing the analog-to-digital conversion of the analog demodulated signal by the analog-to-digital converter according to the first conversion timing signal, and the step e) comprises the steps of:

generating a second conversion timing signal synchronizing with the synchronization timing signal, wherein each pulse of the second conversion timing signal is generated between any two pulses of the first conversion timing signal; and performing the analog-to-digital conversion of the analog input signal by the analog-to-digital converter according to the second conversion timing signal.

11. The control method according to claim 10, wherein a pulse width of each of the first and second conversion timing signals is set to a quarter the symbol period.

12. The control method according to claim 10, further comprising the steps of:

generating a first selecting timing signal in the middle of the symbol period from the first and second conversion timing signals; and generating a second selecting timing signal within a pulse interval of the first selecting timing signal from the first and second conversion timing signals, wherein, in the step c), one of the analog input signal and the analog demodulated signal is selected according to the first selecting timing signal and, in the step (f), the digital output of the analog-to-digital converter is divided into the digital demodulated signal and the digital input signal according to the second selecting timing signal.

13. A radio selective call receiver comprising;

a touch panel placed on a display to form a touch screen, for inputting an instruction to produce an analog input signal;

a radio receiver for receiving a radio signal and demodulating it to produce an analog demodulated signal whose amplitude varies in a symbol period;

a selector for selecting one of the analog input signal and the analog demodulated signal;

an analog-to-digital converter for converting a selected signal to a digital form;

a timing controller for sharing the analog-to-digital converter between the analog demodulated signal and the analog input signal such that an analog-to-digital conversion of the analog demodulated signal is performed at intervals synchronizing with the analog demodulated signal to produce a digital demodulated signal, and that an analog-to-digital conversion of the analog input signal is performed within a time period during which the analog-to-digital conversion of the analog demodulated signal is not performed to produce a digital input signal; and a receiving controller for detecting an incoming call from the digital modulated signal by comparing a calling number included in the digital modulated signal with a preset identification number; and a touch location detector for detecting a touch location from the digital input signal to identify the instruction.

* * * * *